United States Patent
Fuke

(10) Patent No.: US 11,327,478 B2
(45) Date of Patent: May 10, 2022

(54) PROGRAM FOR OPERATING VEHICLE FROM OUTSIDE VEHICLE

(71) Applicant: TOYOTA JIDOSHA KABUSHIKI KAISHA, Toyota (JP)

(72) Inventor: Jumpei Fuke, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 16/693,600

(22) Filed: Nov. 25, 2019

(65) Prior Publication Data

US 2020/0218250 A1     Jul. 9, 2020

(30) Foreign Application Priority Data

Jan. 7, 2019    (JP) .............................. JP2019-000781

(51) Int. Cl.
     *G05D 1/00*         (2006.01)
     *G06K 9/62*         (2022.01)
     *G06K 9/00*         (2022.01)

(52) U.S. Cl.
     CPC ......... *G05D 1/0016* (2013.01); *G05D 1/0033* (2013.01); *G06K 9/00201* (2013.01); *G06K 9/6215* (2013.01); *G05D 2201/0213* (2013.01)

(58) Field of Classification Search
     CPC ............... G05D 1/0016; G05D 1/0033; G05D 2201/0213; G06K 9/6215; G06K 9/00201; G06K 9/00812; G06K 9/00805; B62D 1/00; B62D 15/027
     USPC .......................................................... 701/2
     See application file for complete search history.

(56) References Cited

U.S. PATENT DOCUMENTS

| | | | | |
|---|---|---|---|---|
| 5,234,071 A | * | 8/1993 | Kajiwara | ........... B60K 31/0008 180/169 |
| 2015/0375741 A1 | | 12/2015 | Kiriya | |
| 2018/0151088 A1 | * | 5/2018 | Tan | ........................ G07C 5/008 |
| 2018/0268629 A1 | * | 9/2018 | Jain | ..................... G07C 9/00309 |
| 2020/0086852 A1 | * | 3/2020 | Krekel | .................. B60W 50/14 |

FOREIGN PATENT DOCUMENTS

| | | |
|---|---|---|
| JP | 11051639   * | 2/1999 |
| JP | 2005-189087 A | 7/2005 |
| JP | 2007-295033 A | 11/2007 |

(Continued)

*Primary Examiner* — Muhammad Shafi
(74) *Attorney, Agent, or Firm* — Oblon, McClelland, Maier & Neustadt, L.L.P.

(57) ABSTRACT

A program stored in a mobile terminal including a computer, a camera, a display, and a communication device, the program being configured to operate an operation target vehicle from outside with use of the mobile terminal, the operation target vehicle being registered in advance, the program causing the computer to execute: a step of estimating a distance from the mobile terminal to the operation target vehicle based on a size of an image of the operation target vehicle included in a photographed image of the camera; a step of determining whether or not the estimated distance is less than a prescribed threshold; a step of receiving an operation instruction with respect to the operation target vehicle when the estimated distance is less than the threshold; and a step of causing the communication device to output a signal instructing an operation in response to the received operation instruction.

9 Claims, 8 Drawing Sheets

(56) References Cited

FOREIGN PATENT DOCUMENTS

| | | |
|---|---|---|
| JP | 2014-033320 A | 2/2014 |
| JP | 2015-089733 A | 5/2015 |
| JP | 2016-007959 A | 1/2016 |
| JP | 2016-529767 A | 9/2016 |
| JP | 2016-225930 A | 12/2016 |
| JP | 2018-176823 A | 11/2018 |
| WO | WO-2015-068032 * | 5/2015 |
| WO | WO 2015/068032 A1 | 5/2015 |

* cited by examiner

PROGRAM FOR OPERATING VEHICLE FROM OUTSIDE VEHICLE

INCORPORATION BY REFERENCE

The disclosure of Japanese Patent Application No. 2019-000781 filed on Jan. 7, 2019 including the specification, drawings and abstract is incorporated herein by reference in its entirety.

BACKGROUND

1. Technical Field

The disclosure relates to a program for operating a vehicle from outside the vehicle.

2. Description of Related Art

Japanese Patent Application Publication No. 2016-007959 discloses a vehicle device that allows parking operation to be performed from outside a vehicle by using a mobile terminal. Japanese Patent Application Publication No. 2015-089733 (JP 2015-089733 A) discloses a parking assist system that measures a distance between a vehicle and a mobile terminal by transmitting and receiving an ultrasonic wave between an in-vehicle device and the mobile terminal and that moves the vehicle when the measured distance is within a prescribed range.

SUMMARY

In the case of performing remote parking operation (hereinafter called "remote parking") using a mobile terminal from outside a vehicle, it is necessary to restrict an area that is operable from a mobile terminal within a range determined by law. According to the configuration disclosed in JP 2015-089733 A, the distance between the vehicle and the mobile terminal is measured by transmitting and receiving an ultrasonic wave. However, it is not realistic to mount an ultrasonic communication function on general-purpose mobile terminals, such as smartphones.

Therefore, it is an object of the present disclosure to provide a program capable of restricting a vehicle operable range that is operable from outside the vehicle using a general-purpose mobile terminal such as a smartphone.

The present disclosure relates to a program stored in a mobile terminal including a computer, a camera, a display, and a communication device, the program being configured to operate an operation target vehicle from outside with use of the mobile terminal, the operation target vehicle being registered in advance. The program causes a computer to execute: a step of estimating a distance from the mobile terminal to the operation target vehicle based on a size of an image of the operation target vehicle included in a photographed image of the camera; a step of determining whether or not the estimated distance is less than a prescribed threshold; a step of receiving an operation instruction with respect to the operation target vehicle when the estimated distance is less than the threshold; and a step of causing the communication device to output a signal instructing an operation in response to the received operation instruction.

The present disclosure can provide a program capable of restricting a vehicle operable range that is operable from outside the vehicle using a general-purpose mobile terminal such as a smartphone.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicle operation program according to one embodiment of the present disclosure estimates a distance from a mobile terminal to a vehicle, based on the size of a vehicle image included in an image photographed with a camera of the mobile terminal, and determines the propriety of remote parking operation in accordance with the estimated distance. Therefore, it becomes possible to restrict the range where remote control of the vehicle is allowed with use of a general-purpose mobile terminal with a camera.

Embodiment

Figure 1:
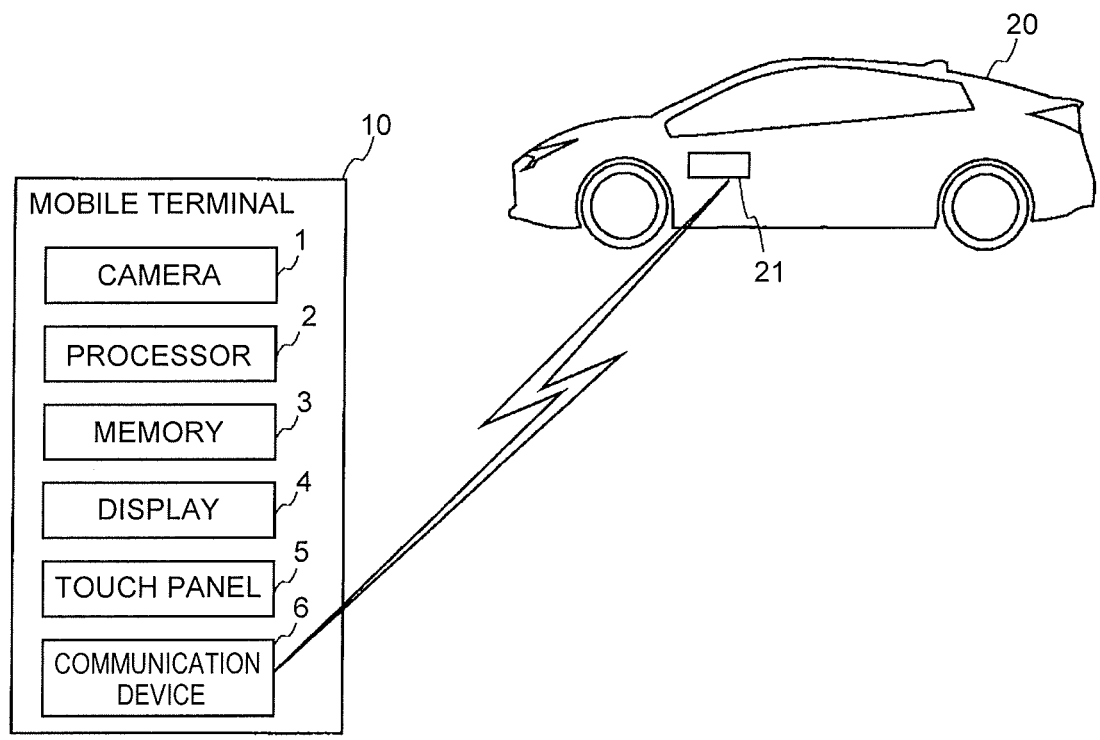
FIG. 1 is a functional block diagram showing the schematic configuration of a remote parking system according to an embodiment.

FIG. 1 is a functional block diagram showing the schematic configuration of a remote parking system according to an embodiment.

Configuration

The remote parking system according to the present embodiment is configured with a mobile terminal 10 in which a program for executing remote parking from outside the vehicle is installed, and an in-vehicle device 21 that operates a vehicle 20 in response to an instruction from the mobile terminal 10.

The mobile terminal 10 is a general-purpose computer that allows installation and execution of programs (applications) for smartphones, tablets, or other devices. The mobile terminal 10 includes a camera 1, a processor 2, a memory 3, a display 4, a touch panel 5, and a communication device 6. Installed in the memory 3 is a vehicle operation program for executing remote parking of the vehicle 20, the vehicle operation program being executable by a computer. When the processor 2 reads and executes the vehicle operation program stored in the memory 3, the mobile terminal 10 functions as a vehicle operation device for executing the remote parking. The vehicle operation program estimates a distance from the mobile terminal 10 to the vehicle 20 based on the size of an image of the vehicle 20 included in a photographed image of the camera 1. When the estimated distance is a distance that allows remote control of the vehicle 20, the vehicle operation program permits remote parking, and causes the communication device 6 to output a signal instructing remote parking to the in-vehicle device 21. The details of the program of executing remote parking will be described later.

The in-vehicle device 21 communicates with the communication device 6 of the mobile terminal 10, and controls parking operation of the vehicle 20 in response to an instruction from the mobile terminal 10. The in-vehicle device 21 is implemented as an ECU including a processor and a memory, for example. The processor reads and executes a remote parking program prestored in the memory, and controls the vehicle 20 by outputting, based on the result of executing the program, operation instructions to ECUs, such as a powertrain ECU, a steering ECU, and a brake ECU. The mode of communication between the in-vehicle device 21 and the mobile terminal 10 is not particularly limited as long as it is a widely used communication mode adopted in the general-purpose mobile terminals, such as Bluetooth (registered trademark) and Wi-Fi (registered tradem ark).

Control Process

A control process of the vehicle operation program will be described below with reference to FIG. 1, together with FIGS. 2A to 6B.

Figure 2A:
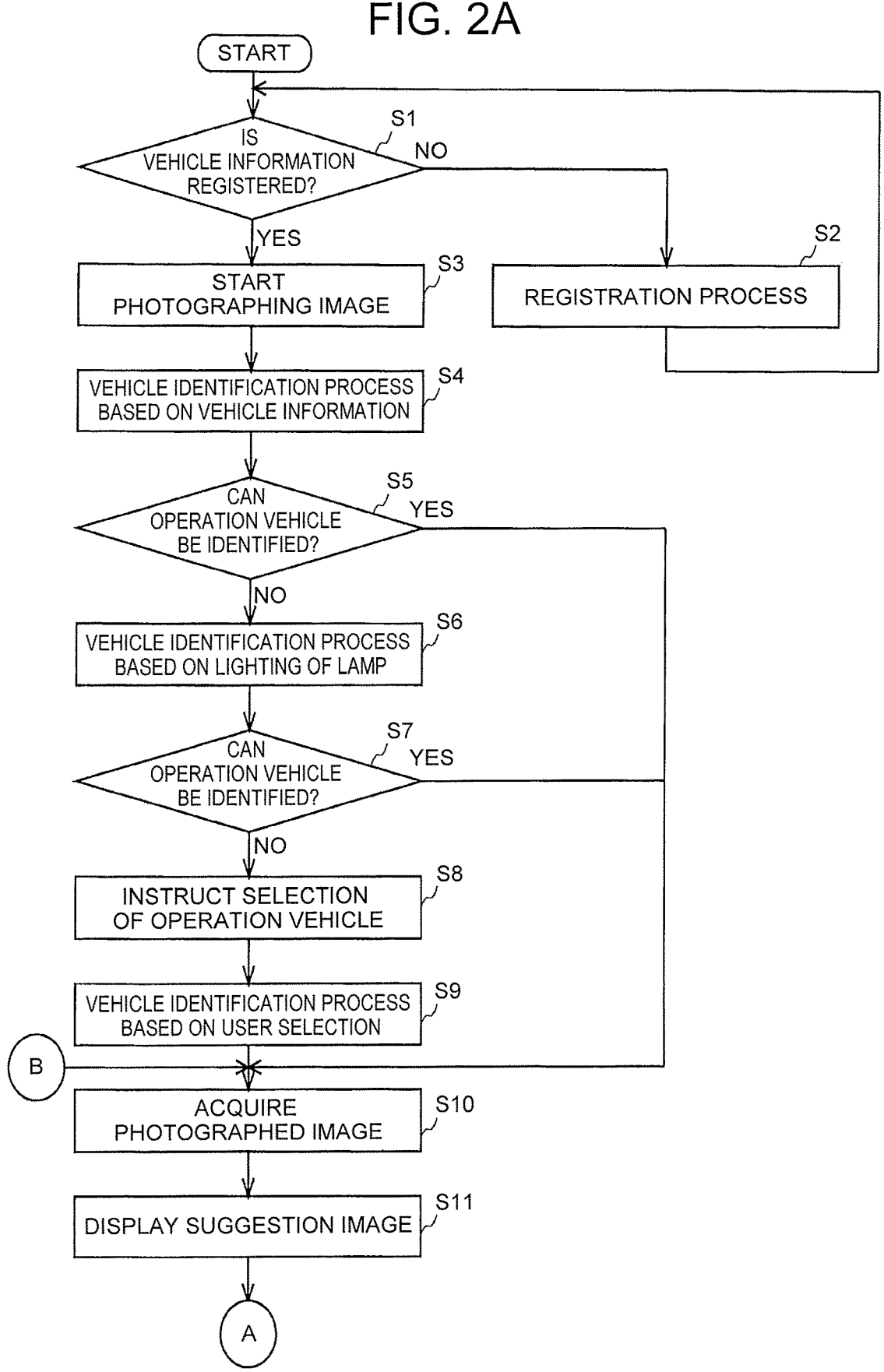
FIG. 2A is a flowchart showing a control process executed by a vehicle operation program according to the embodiment.
Figure 2B:
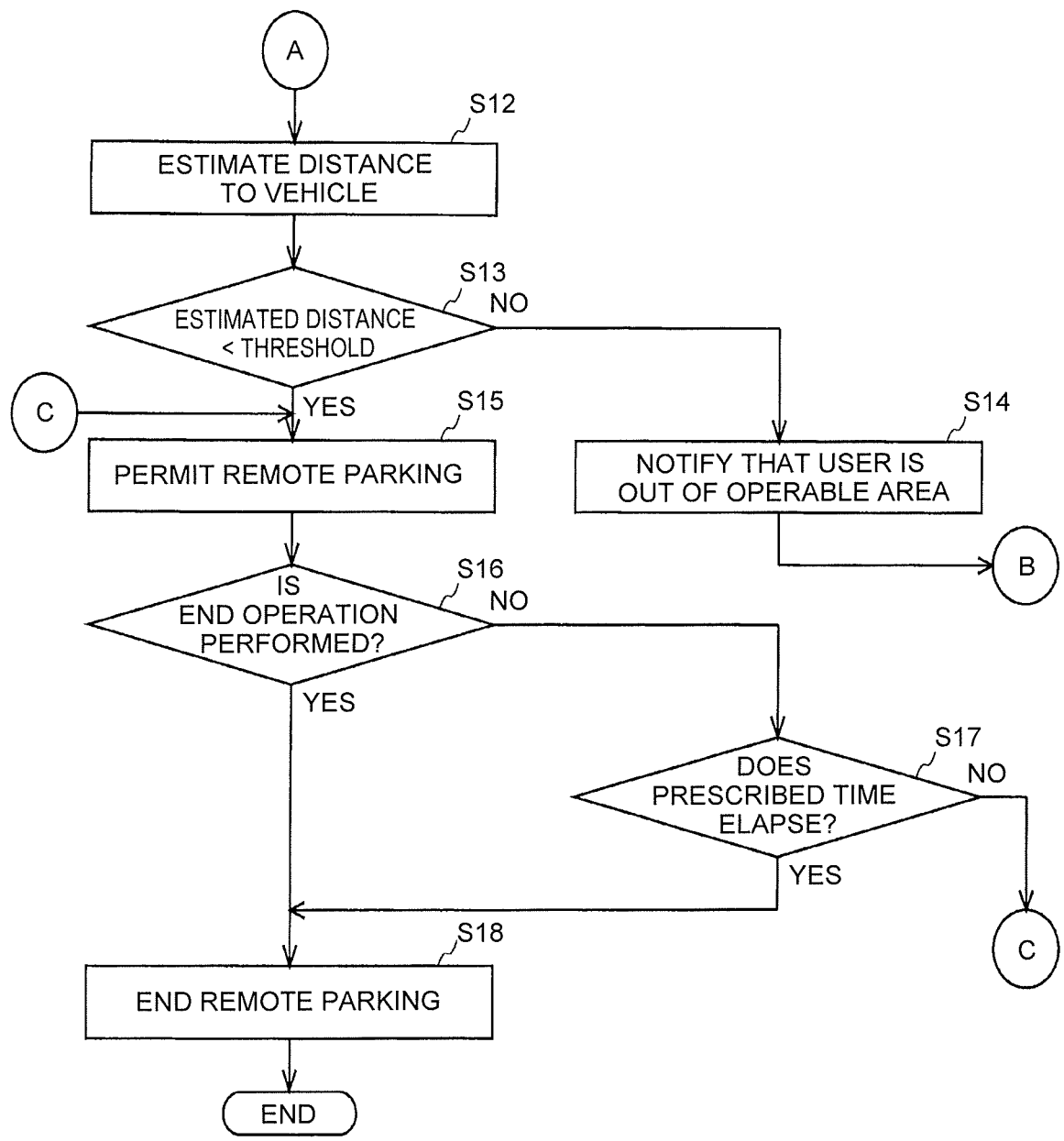
FIG. 2B is a flowchart showing a control process subsequent to FIG. 2A.
Figure 3A:
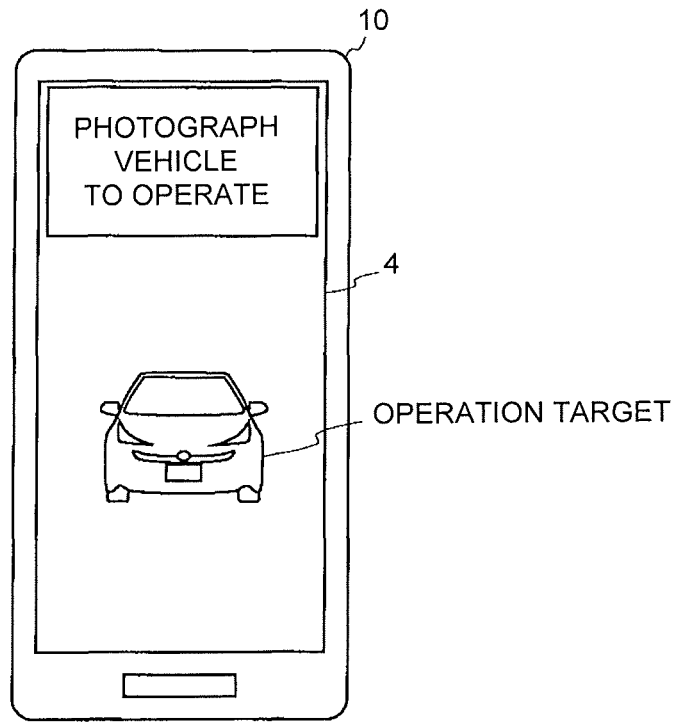
FIG. 3A is an explanatory view showing an example of a method for identifying an operation target vehicle.
Figure 3B:
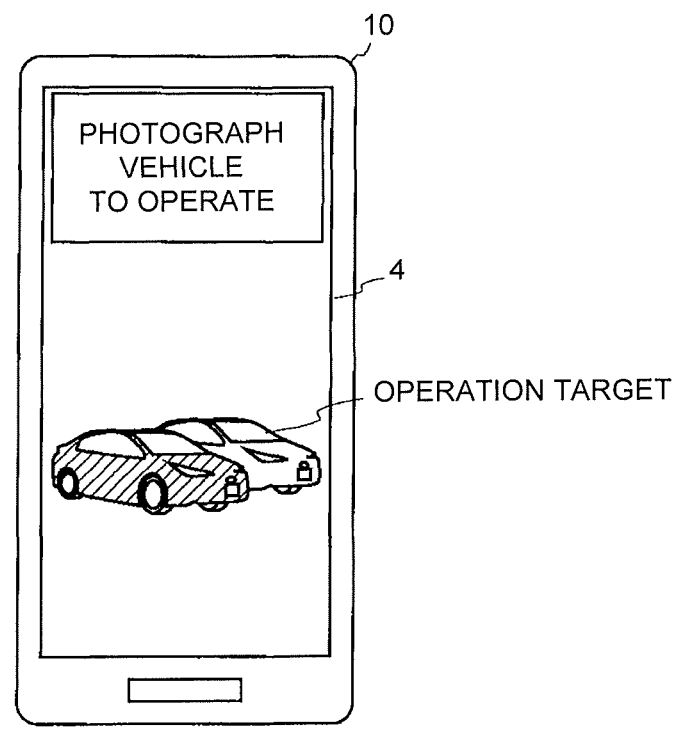
FIG. 3B is an explanatory view showing an example of the method for identifying the operation target vehicle.
Figure 3C:
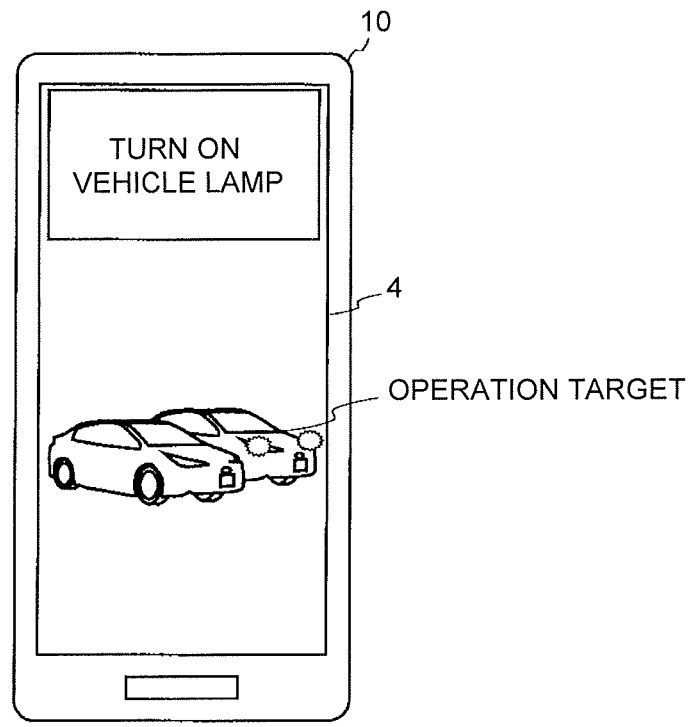
FIG. 3C is an explanatory view showing an example of the method for identifying the operation target vehicle.
Figure 3D:
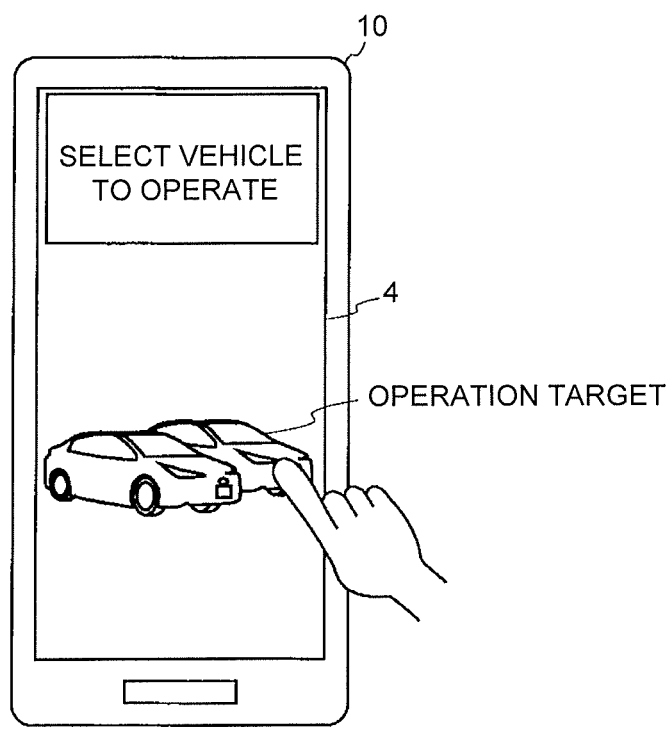
FIG. 3D is an explanatory view showing an example of the method for identifying the operation target vehicle.
Figure 4:
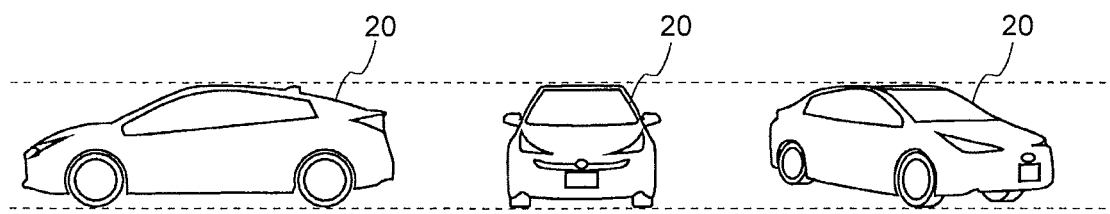
FIG. 4 is an explanatory view showing a relationship between a photographing position and a vehicle height.

FIGS. 2A and 2B are flowcharts showing a control process executed by the vehicle operation program according to the embodiment. FIGS. 3A to 3D are explanatory views showing examples of a method for identifying an operation target vehicle. FIG. 4 is an explanatory view about a relationship between a photographing position and a vehicle height. The control process shown in FIGS. 2A and 2B is started in response to an instruction for starting up the vehicle operation program (application) installed in the mobile terminal 10.

Step S1: the processor 2 determines whether or not information on an operation target vehicle (hereinafter, referred to as "vehicle information") is already registered. The vehicle information is used for identifying the vehicle as a target of remote parking. As the vehicle information, information such as a vehicle type, a body color, and a license plate number may be used independently or in a proper combination.

When the result of determination in step S1 is YES, the process proceeds to step S3. Otherwise, the process proceeds to step S2.

Step S2: the processor 2 executes a registration process of the vehicle information. For example, the processor 2 displays on the display 4 an entry form of the vehicle information, and encourages a user to register necessary vehicle information. The user can input vehicle information by operating the touch panel 5 or other operations. The processor 2 may store the input information in the memory 3, or may save the information in an external server through the communication device 6. Then, the process proceeds to step S1.

Step S3: the processor 2 starts up the camera 1 and starts to photograph an image with the camera 1. Once photographing is started, the processor 2 displays on the display 4 a photographed image with the camera 1 and a message that encourages the user to photograph an image of the operation target vehicle in a superimposed manner as shown in FIG. 3A. The images photographed with the camera 1 from the start of photographing in step S3 until execution of later-described step S10 are images used for identifying the operation target vehicle. Therefore, as shown in FIG. 3A, the photographed image needs to include the operation target vehicle. Although an image of the entire vehicle 20 as an operation target is photographed from the front side in FIG. 3A, the photographed image may include only some portions of the operation target vehicle, or the photographed image may include another vehicle together with the vehicle 20 as the operation target. Then, the process proceeds to step S4.

Step S4: the processor 2 identifies the operation target vehicle included in the photographed image based on the photographed image of the camera 1 and the vehicle information registered in advance. Specifically, when the photographed image includes an image of the vehicle, the processor 2 extracts features of the vehicle included in the photographed image. The processor 2 collates extracted vehicle feature information with the vehicle information registered in advance, and identifies the vehicle included in the photographed image as an operation target vehicle based on a matching degree of both the information. For example, when the photographed image is the image shown in FIG. 3A, the information on the license plate number can be extracted as a feature of the vehicle. Since the license plate number is unique information, the vehicle included in the photographed image can immediately be identified as an operation target vehicle when the extracted license plate number matches the registered license plate number. However, there may be a case where not all the numerals of the license plate number are recognizable from the photographed image due to photographing conditions, obstacles, or the like. In that case, the processor 2 tries to identify the operation target vehicle by using a vehicle type or a body color identified from the image as a determination material together with the recognition result of the license plate number. For example, assume the case of a photographed image shown in FIG. 3B. In this case, the license plate number does not completely match the registration information for such a reason that the photographed image includes two vehicles, and not all the numerals constituting the license plate number are recognizable. In this case, if the license plate number of one of the vehicles partially matches the registration information, and the body color (for example, white) of the one vehicle matches the registered body color, the operation target vehicle can be identified in the photographed image. Then, the process proceeds to step S5.

Step S5: the processor 2 determines whether or not the operation target vehicle is identified in the photographed image in step S4. When the result of determination in step S5 is YES, the process proceeds to step S10. Otherwise, the process proceeds to step S6.

Step S6: the processor 2 identifies the operation target vehicle included in the photographed image based on a lighting state of a lamp of the vehicle. When determining NO in step S5, the processor 2 instructs the in-vehicle device 21 to turn on a vehicle lamp (one or more types of lamp out of a head lamp, a small lamp, and blinkers) through the communication device 6. A lighting method of the vehicle lamp is not particularly limited. The vehicle lamp may continuously be turned on for a fixed time, or may be blinked in a prescribed cycle or pattern. A plurality of types of lamp may be turned on in combination. For example, assume the case of a photographed image shown in FIG. 3C. In this case, the operation target vehicle cannot be identified with only the information on the license plate number, since the photographed image includes two vehicles identical in vehicle type and body color. In this case, the processor 2 instructs the in-vehicle device 21 to continuously turn on the lamp through the communication device 6. When one of the vehicles has the lamp continuously turned on in the photographed image, the operation target vehicle can be identified in the photographed image. The process then proceeds to step S7.

Step S7: the processor 2 determines whether or not the operation target vehicle can be identified in the photographed image in step S6. When the result of determination in step S7 is YES, the process proceeds to step S10. Otherwise, the process proceeds to step S8.

Step S8: the processor 2 instructs the user to select the operation target vehicle. For example, assume the case of a photographed image shown in FIG. 3D. In this case, the operation target vehicle cannot be identified with only the information on the license plate number, since the photographed image includes two vehicles identical in vehicle type and body color. Moreover, since it is nighttime, it is also difficult to identify the operation target vehicle based on the presence of the lighting of the lamp. In this case, the processor 2 displays on the display 4 a message that encourages the user to select the operation target vehicle by tap operation as shown in FIG. 3D. The user selects the operation target vehicle by tap operation on the touch panel 5. Then, the process proceeds to step S10.

Step S9: the processor 2 identifies the vehicle selected in step S8 as an operation target vehicle. Then, the process proceeds to step S10.

As described in steps S8 and S9, when a specific process of the operation target vehicle is executed by user input, the specific process of the operation target vehicle based on the vehicle information or the lighting state of the lamp described in steps S4 to S7 may be omitted. However, when the specific process of the operation target vehicle is executed based on the vehicle information or the lighting state of the lamp, the operation target vehicle can be identified only by photographing the vehicle with the camera 1, without the necessity of the input operation by the user. Hence, enhanced convenience is provided.

Step S10: the processor 2 acquires an image of the operation target vehicle identified in the process of steps S4 to S9 from the photographed image of the camera 1. The image of the operation target vehicle acquired in step S10 is used for estimating the distance from the mobile terminal 10 to the vehicle 20 in a subsequent step. Then, the process proceeds to step S11.

Here, the principle of distance estimation in the present embodiment will be described. The size of an image of the vehicle included in the image photographed with the camera 1 is determined in accordance with a distance from the mobile terminal 10 to the vehicle 20 and a focal length (viewing angle) of the camera 1. In short, an image of the vehicle 20 photographed from the position away by a constant distance (for example, 6 m that is a threshold of remote parking operable range) from the vehicle 20 is defined as a reference image, and the size of the reference image is prestored as a reference image size. As a result, by comparing the size of an image of the vehicle included in the photographed image with the size of the reference image, it can be determined whether the distance between the mobile terminal 10 and the vehicle 20 is shorter or longer than the constant distance. When the photographing direction of the vehicle 20 varies, the image height in a vehicle height direction is not very different as shown in FIG. 4. Therefore, when the distance between the mobile terminal 10 and the vehicle 20 is estimated, it is desirable to use the image height in the vehicle height direction as a size of the image used for comparison with the reference image. However, when the photographing direction of the vehicle 20 is limited to a certain direction (for example, only in a facing direction), the distance between the mobile terminal 10 and the vehicle 20 may be estimated based on a size other than the image height in the vehicle height direction, such as an image width in a vehicle width direction. A specific process of distance estimation will be mentioned later.

Step S11: the processor 2 generates a suggestion image that suggests an index of the distance between the mobile terminal 10 and the vehicle 20, and displays on the display 4 the generated suggestion image so as to be superimposed on the photographed image. When remote parking is executed, the user holding the mobile terminal 10 needs to be in an operable distance (for example, 6 m) determined by law. Accordingly, the vehicle operation program according to the present embodiment suggests to the user whether or not the position of the user holding the mobile terminal 10 is in the operable range in accordance with a size relation or positional relation between the suggestion image and the image of the operation target vehicle. Then, the process proceeds to step S12.

Here, a display mode of the suggestion image according to the present embodiment will be described with reference to FIGS. 5 to 6C.

Figure 5:
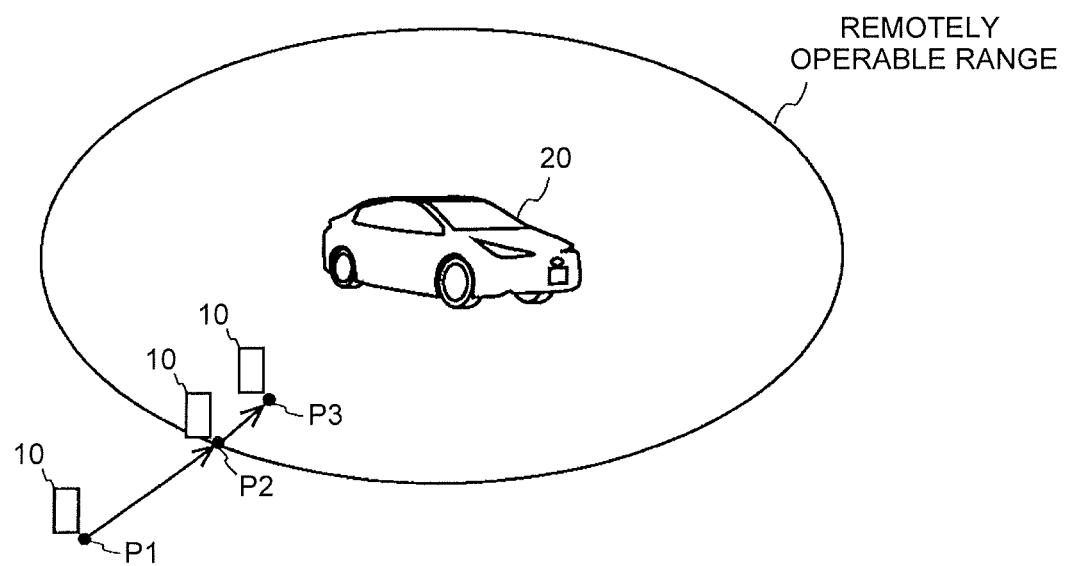
FIG. 5 shows a relationship between a vehicle operable range and the position of a mobile terminal.
Figure 6A:
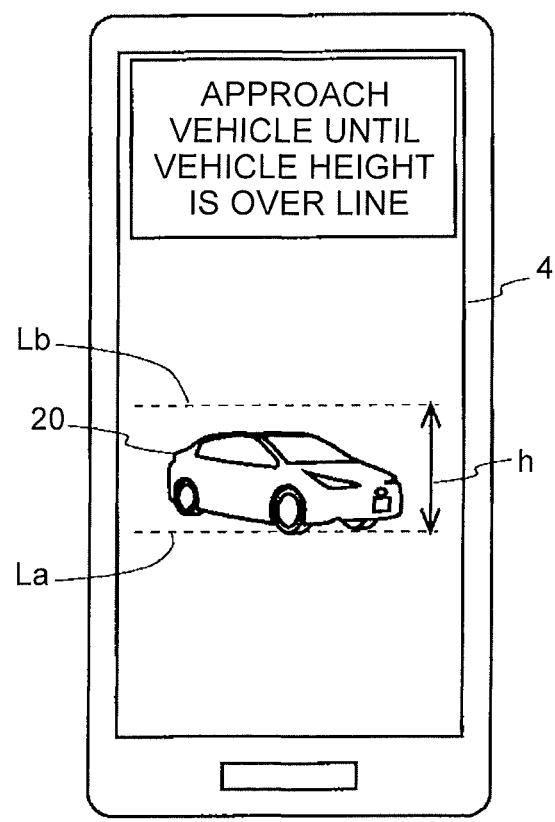
FIG. 6A shows an image of the vehicle photographed from a position P1 shown in FIG. 5.
Figure 6B:
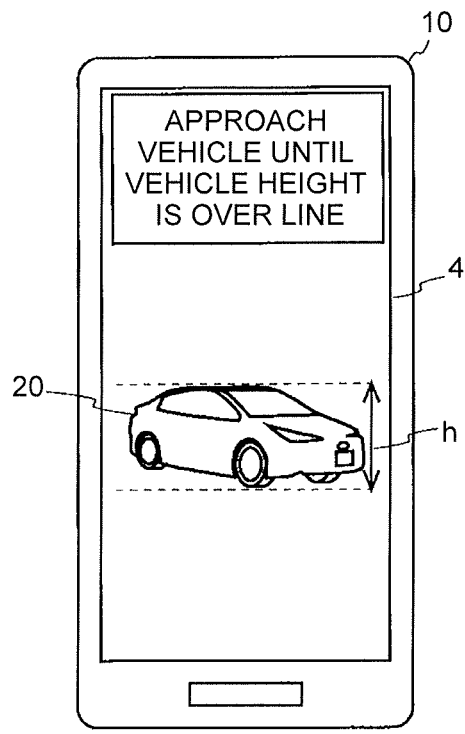
FIG. 6B shows an image of the vehicle photographed from a position P2 shown in FIG. 5.

FIG. 5 shows a relationship between the operable range of the vehicle and the position of the mobile terminal. FIGS. 6A to 6C show images of the vehicle photographed from positions P1 to P3 shown in FIG. 5, respectively.

As shown in FIG. 6A, the suggestion image according to the present embodiment is an image constituted of a line La indicating a grounding position of the vehicle 20, and a line Lb that is parallel to the line La, the line Lb being configured to identify the position away by a prescribed image height h in the vehicle height direction from the line La. The image height h (hereinafter, referred to as "height of the suggestion image") in the vehicle height direction between the line La and the line Lb is a fixed value on the assumption that the viewing angle (zoom ratio) of the camera is fixed. When the distance from the mobile terminal 10 to the vehicle 20 is equal to an operable distance, the image height h matches the vehicle height in the image of the vehicle. The image height h of the suggestion image may be set in accordance with the vehicle height of the registered vehicle type and the focal length (viewing angle) of the camera. In calculating the image height h of the suggestion image, information for distance estimation used in the later-described step S12 may be used. When displaying the suggestion image so as to be superimposed on the photographed image in step S11, the processor 2 recognizes the grounding position of the vehicle 20 in the photographed image by image processing, and adjusts the display position of the suggestion image such that the line La of the suggestion image substantially matches the grounding position of the vehicle 20.

When the user holding the mobile terminal 10 is at the position P1 shown in FIG. 5, the distance from the mobile terminal 10 to the vehicle 20 is longer than the operable distance. Therefore, as shown in FIG. 6A, the image height of the vehicle 20 displayed on the display 4 becomes smaller than the image height h of the suggestion image. By contrast between the image height of the vehicle 20 and the image height h of the suggestion image, the user can recognize that the user is out of the operable range of remote parking. When the mobile terminal 10 is out of the operable range, it is desirable to display on the display 4 a message that encourages the user to approach the vehicle as shown in FIG. 6A.

Next, when the user holding the mobile terminal 10 moves to the position P2 shown in FIG. 5, the distance from the mobile terminal 10 to the vehicle 20 becomes substantially equal to the operable distance. Therefore, as shown in FIG. 6B, the image height of the vehicle 20 displayed on the display 4 substantially matches the image height h of the suggestion image. By contrast between the image height of the vehicle 20 and the image height h of the suggestion image, the user can recognize that the user is in the vicinity of a boundary of the remote parking operable range.

Next, when the user holding the mobile terminal 10 moves to the position P3 shown in FIG. 5, the distance from the mobile terminal 10 to the vehicle 20 becomes shorter than the operable distance. Therefore, as shown in FIG. 6C, the image height of the vehicle 20 displayed on the display 4 becomes larger than the image height h of the suggestion image. By contrast between the image height of the vehicle 20 and the image height h of the suggestion image, the user can recognize that the user is in the remote parking operable range.

The image height of the vehicle 20 included in the photographed image changes in accordance with an object distance. When the object distance of the vehicle 20 is equal to the remote parking operable distance, the image height h of the suggestion image is set to be equal to the image height of the vehicle 20. This enables the user holding the mobile terminal 10 to visually recognize whether the user in or out of the operable range. The suggestion image is displayed while being adjusted such that the line La constituting a part of the suggestion image substantially matches the grounding position of the vehicle. This makes it easy to compare the image height h of the suggestion image and the image height of the vehicle 20.

Step S12: the processor 2 estimates the distance from the mobile terminal 10 to the vehicle 20 based on the photographed image of the camera 1. Specifically, the processor 2 prestores information for distance estimation in the memory 3. In the information for distance estimation, the height of a prescribed object, an object distance from the camera 1 of the mobile terminal 10 to the object, and an image height of the prescribed object included in an image of the prescribed object photographed from the object distance are associated with each other. The processor 2 performs distance estimation based on the pre stored information for di stance estimation and the information on the photographed image.

Here, as a specific example of distance estimation, first to third estimation methods will be described. As long as the distance from the mobile terminal 10 to the vehicle 20 can be estimated, the estimation method of the distance is not limited to the following examples.

In the first estimation method, from an image of a pole having a height of 1 m that is photographed from a position distanced by 6 m, an image height X of the pole (the number of pixels on an image sensor, or the number of pixels of an obtained image, to be specific) is prepared for every type of camera 1 of the mobile terminal 10. Vehicle height data for every vehicle type is also prestored in the memory 3. When the vehicle height of an operation target vehicle registered as a target of remote parking is 1.5 m, the image height of the vehicle included in an image of the operation target vehicle photographed from the position distanced by 6 m is equal to 1.5×. The processor 2 can calculate the image height of the vehicle included in the photographed image acquired in step S10, and can estimate the distance from the mobile terminal 10 to the vehicle 20 based on a ratio between the calculated image height and a reference image height that is 1.5×.

In the second estimation method, the user photographs an operation target vehicle from any distance L2, and stores in the memory 3 the object distance L2 and an image height h2 of the vehicle included in the photographed image. Based on a ratios L2/L1 between the object distance L2 registered by the user and the operable distance L1 and on the image height h2 of the vehicle, the processor 2 calculates h1=h2× (L2/L1) that is an image height h1 of the vehicle when the vehicle is photographed from a position that is distanced by the distance L1 from the vehicle. The processor 2 can calculate the image height of the vehicle included in the photographed image acquired in step S10, and can estimate the distance from the mobile terminal 10 to the vehicle 20 based on the ratio between the calculated image height and the reference image height h1.

In the third estimation method, a photographable height of the camera 1 within the remote parking operable distance is calculated based on the focal length (viewing angle) of the camera 1 and the sizes (dimensions or the number of pixels) of horizontal and vertical directions of an image sensor. Based on a ratio between the calculated photographable height and the vehicle height of an operation target vehicle, the image height of the vehicle included in the photographed image photographed from the operable distance is calculated. In the third estimation method, the processor 2 can also calculate the image height of the vehicle included in the photographed image acquired in step S10, and can estimate the distance from the mobile terminal 10 to the vehicle 20 based on a ratio between the calculated image height and a reference image height calculated from viewing angles of the camera and the image sensor.

When calculation of the estimated distance from the mobile terminal 10 to the vehicle 20 is completed, the process proceeds to step S13.

Step S13: the processor 2 determines whether the estimated distance calculated in step S12 is less than a threshold (remote parking operable distance). When the estimated distance from the mobile terminal 10 to the vehicle 20 matches the remote parking operable distance, remote parking can legally be permitted. However, since the estimated distance may include an error, it is more desirable in terms of safety to exclude the case where the estimated distance is equal to the threshold as a result of determination in step S13. When the result of determination in step S13 is YES, the process proceeds to step S15. Otherwise, the process proceeds to step S14.

Step S14: the processor 2 notifies that the current location of the user is out of the remote parking operable range by display on the display 4, by voice, by vibration, and the like. Then, the process proceeds to step S10.

Step S15: the processor 2 permits execution of remote parking, displays an operation screen (such as buttons) for instructing execution of remote parking on the display 4, and receives an operation instruction with respect to the operation target vehicle. For example, as in the example shown in FIG. 6C, the processor 2 displays on the display 4 a message ("OK") indicating that the remote parking is executable, and an "execute parking" button for instructing execution of remote parking to the in-vehicle device 21. Upon reception of the instruction for execution of the remote parking from the user through operation of the touch panel 5, the processor 2 instructs execution of remote parking to the in-vehicle device 21 of the vehicle 20 through the communication device 6. Then, the process proceeds to step S16.

Step S16: the processor 2 determines whether or not an end operation of remote parking is received. Examples of the end operation of remote parking include a confirmation operation performed by the user to confirm the end of the remote parking in the mobile terminal 10 after the in-vehicle device 21 moves the vehicle to a parking location and the parking operation is completed, an instruction operation performed by the user to instruct the end of the remote parking in the mobile terminal 10, and an end operation performed by the user to end the vehicle operation program itself in the mobile terminal 10. When the result of determination in step S16 is YES, the process proceeds to step S18. Otherwise, the process proceeds to step S17.

Step S17: the processor 2 determines whether or not a prescribed time elapses after remote parking is permitted in step S15. The determination of step S17 is performed to limit the time when the remote parking is executable to a fixed time period. When the result of determination in step S17 is YES, the process proceeds to step S18. Otherwise, the process proceeds to step S15.

Step S18: the processor 2 instructs the end of remote parking to the in-vehicle device 21 of the vehicle 20 through communication device 6. Then, the process is ended.

Effects

As described above, the vehicle operation program according to the present embodiment determines whether or not an estimated distance from the mobile terminal 10 to the vehicle 20 is less than a remote parking operable distance based on the size of an image of the vehicle 20 photographed with the camera 1, and permits execution of remote parking from outside the vehicle when the estimated distance is less than the operable distance. Therefore, the vehicle operation program according to the present embodiment can restrict the range where the vehicle can be operated from outside the vehicle, and conform to the regulation regarding the remote control of the vehicle, while using a mobile terminal including the camera 1, such as a general-purpose smartphone and a tablet. As the method for restricting the range where the mobile terminal can remotely control the vehicle, a method of using LF communication that is used in a smart key system, and a method of using ultra-wide band (UWB) communication can be considered. However, since the LF communication and the UWB communication are not the communication modes generally mounted on general-purpose mobile terminals such as smartphones, these communication modes are not realistic. A study is also made on the use of the general-purpose mobile terminals, such as smartphones, as a key of the vehicle in place of the smart key using LF-RF communication. In this case, the LF communication itself may become no longer mounted on the in-vehicle device 21, and the communication mode usable in the mobile terminal 10 may be limited to a Bluetooth (registered trademark) communication mode or a Wi-Fi (registered trademark) communication mode. However, the vehicle operation program according to the present embodiment performs distance estimation based on a photographed image of the camera 1, and allows the existing communication modes to be used in operation instruction to the in-vehicle device 21. Hence, it becomes possible to operate the general-purpose mobile terminals as a device for operating the vehicle, without the necessity of using a specific communication mode.

In the vehicle operation program according to the present embodiment, a suggestion image that suggests the distance from the mobile terminal 10 to the vehicle 20 is displayed so as to be superimposed on the photographed image of the camera 1. This makes it possible to visually present to the user that the user is in or out of the remote parking operable range. In the vehicle operation program according to the present embodiment, the user needs to capture the vehicle 20 in a photographing range of the camera 1 in order to estimate the distance from the mobile terminal 10 to the vehicle 20. Hence, the user confirms that the vehicle 20 is included in a displayed image of the display 4 while holding the camera 1 over the vehicle 20. Therefore, when the suggestion image superimposed on the photographed image can suggest the distance to the vehicle 20, confirmation of the photographed image and confirmation of the distance can be performed at the same time, which provides good convenience. It is to be noted that the method for presenting to the user whether or not the user is in the remote parking operable range is not limited to display of the suggestion image. Instead of the display of the suggestion image, voice or vibration may also be used. In addition to the display of the suggestion image, voice or vibration may also be used.

Figure 6C:
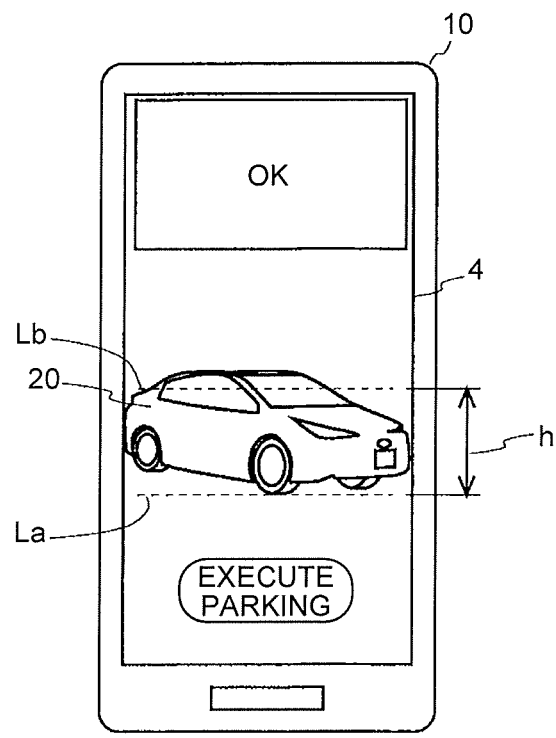
FIG. 6C shows an image of the vehicle photographed from a position P3 shown in FIG. 5.

As shown in FIG. 6A to FIG. 6C, the vehicle operation program according to the present embodiment displays the suggestion image so as to follow after a change in display position of the image of the vehicle 20 displayed on the display 4. The lower end (line La) of the suggestion image is substantially matched with the lower end (grounding position) of the image of the vehicle 20 in a continuous manner. When the suggestion image is displayed in this manner, the image height h of the suggestion image can easily be compared with the image height of the vehicle 20 even in the case where the display position of the image of the vehicle 20 changes on the display 4 due to change in position of the camera 1 during photographing of the vehicle 20 by the user. Although the lower end (line La) of the suggestion image is substantially matched with the lower end (grounding position) of the image of the vehicle 20 in the present embodiment, the upper end (line Lb) of the suggestion image may substantially be matched with the upper end (ceiling position) of the image of the vehicle. When the image size in the vehicle width direction or in the front-rear direction is used for distance estimation in place of the image size in the vehicle height direction, the suggestion image may be displayed such that left ends of the suggestion image and the image of the vehicle 20 substantially match each other or right ends of the images may substantially match each other.

The vehicle operation program according to the present embodiment can recognize an operation target vehicle (vehicle registered in advance) from a vehicle included in the photographed image of the camera 1 based on the vehicle information registered in advance. Accordingly, the user only needs to hold the camera 1 in front of the vehicle 20 to identify the operation target vehicle, which provides good convenience.

When the vehicle is not recognizable based on the vehicle information, the program can instruct the in-vehicle device 21 to turn on the lamp, and based on the change in state of the lamp in the image of the vehicle included in the photographed image of the camera 1, the program can recognize the operation target vehicle included in the photographed image. Therefore, in the case where it is difficult to recognize the operation target vehicle with only the vehicle information, such as the case where the vehicle information cannot be identified due to obstacles or the like, or the case where the photographed image includes an image of a vehicle similar in vehicle type and body color with the operation target vehicle, the operation target vehicle can be identified without the necessity of user operation, which achieves enhanced convenience.

The vehicle operation program according to the present embodiment can further receive selection of an operation target vehicle from the photographed image of the camera 1 by operation of the user. Therefore, even in the case where automatic recognition of the operation target vehicle is difficult, the operation target vehicle can reliably be identified, and availability of remote parking can be enhanced.

In the vehicle operation program according to the present embodiment, when the estimated distance from the mobile terminal 10 to the vehicle 20 is equal to or more than the operable distance, a notification that encourages the user to approach the vehicle 20 can be made. Making such a notification can notify to the user whether the user is in or out of the remotely operable range in an easily understandable manner in unison with the distance suggested by the suggestion image.

Other Modifications

In the above-described embodiment, the vehicle operation program may execute a process of prohibiting zooming of the camera 1. The size of a photographed image also changes with the focal length (viewing angle) of the camera 1. Accordingly, when zooming of the camera is performed, the process of estimating the distance from the mobile terminal 10 to the vehicle 20 can also be influenced. Accordingly, when zooming of the camera is prohibited during the time from the startup to the end of the vehicle operation program, it is possible to prevent unexpected zooming so as to prevent the distance from the mobile terminal 10 to the vehicle 20 from being estimated as an incorrect value and to avoid execution of the remote parking when the user is out of the operable range. When the zooming of the camera 1 is prohibited, the focal length of the camera 1 may be fixed to an initial value (for example, focal length at a wide angle end), or may be fixed to a prescribed focal length (for example, 35 mm).

In the above-described embodiment, the vehicle operation program may correct the reference image size and the size of the suggestion image used in distance estimation, in accordance with the focal length (viewing angle) of the camera at the time of acquiring the photographed image. The correction can be performed based on the third estimation method described above, for example. In the case where zooming is not prohibited, changing the size of the suggestion image in accordance with change in the focal length (viewing angle) of the camera 1 caused by zooming makes it possible to prevent the user from feeling discomfort. When the image height of the suggestion image is corrected based on change in the focal length (viewing angle) of the camera 1, correction may be made such that the image height of the suggestion image becomes equal to the image height of the operation target vehicle photographed at the position away by the operable distance from the operation target vehicle with use of the camera 1 having a selected focal length (viewing angle).

Although two straight lines extending in the horizontal direction are illustrated as a suggestion image in the above-described embodiment, the suggestion image is not limited to this. For example, the suggestion image may be one line (i.e., only the line Lb shown in FIG. 6A to FIG. 6C) representing an image height based on the grounding position of the vehicle, or may be a rectangular frame (i.e., a rectangle including the lines La, Lb shown in FIG. 6A to FIG. 6C). As long as the suggestion image can visually show a difference in size between the image of an operation target vehicle and a reference image, the suggestion image may be any patterns or characters other than the straight line and the frame.

Although the embodiment of the present disclosure has been described in the foregoing, the present disclosure may be defined as a mobile terminal including a computer-readable non-transitory physical recording medium that stores therein the vehicle operation program described above, and a computer that can store, read, and execute the vehicle operation program.

The present disclosure can be used as a program installed in a mobile terminal in order to control vehicle operation, such as remote parking, performed from outsides the vehicle.

What is claimed is:

1. A program stored in a mobile terminal including a processor, a camera, a display, and a communication device, the program being configured to operate an operation target vehicle from outside with use of the mobile terminal, the operation target vehicle being registered in advance, the program causing the processor to execute:
    a step of estimating a distance from the mobile terminal to the operation target vehicle based on a size of an image of the operation target vehicle included in a photographed image of the camera;
    a step of determining whether or not the estimated distance is less than a prescribed threshold;
    a step of receiving an operation instruction from the communication device with respect to the operation target vehicle when the estimated distance is less than the threshold, the operation instruction being a moving instruction;
    a step of causing the communication device to output a signal instructing an operation in response to the operation instruction received from the communication device; and
    a step of making a notification that the mobile terminal is out of an operable range of operating the operation target vehicle when the estimated distance is equal to or more than the threshold.

2. The program according to claim 1, the program causing the processor to further execute a step of displaying on the display a suggestion image so as to be superimposed on the photographed image of the camera, the suggestion image suggesting whether or not the distance from the mobile terminal to the operation target vehicle is less than the threshold, the suggestion image having an image height matching an image height of the operation target vehicle when the distance from the mobile terminal to the operation target vehicle is equal to the threshold.

3. The program according to claim 2, wherein in the step of displaying the suggestion image on the display, the suggestion image is displayed such that a lower end position of the image of the operation target vehicle included in the photographed image of the camera substantially matches a lower end position of the suggestion image.

4. The program according to claim 2, the program causing the processor to further execute a step of prohibiting zooming of the camera.

5. The program according to claim 2, the program causing the processor to further execute a step of changing the image height of the suggestion image in accordance with change in focal length of the camera at the time of zooming, such that the image height of the suggestion image matches the image height of the operation target vehicle, when the distance from the mobile terminal to the operation target vehicle is equal to the threshold.

6. The program according to claim 1, the program causing the processor to further execute:
- a step of prestoring vehicle information for identifying the operation target vehicle; and
- a step of identifying, before the step of estimating the distance, the image of the operation target vehicle in the photographed image of the camera based on the vehicle information.

7. The program according to claim 6, wherein the vehicle information is at least one of a vehicle type, a license plate number, and a body color.

8. The program according to claim 1, the program causing the processor to further execute, before the step of estimating the distance, a step of outputting an instruction to turn on a lamp to a vehicle associated with the mobile terminal and identifying as the image of the operation target vehicle an image of the vehicle included in the photographed image of the camera, the vehicle having the lamp turned on in response to the instruction.

9. The program according to claim 1, the program causing the processor to further execute, before the step of estimating the distance, a step of receiving selection of an image of the vehicle included in the photographed image of the camera by operation of a user and identifying as the image of the operation target vehicle the image of the vehicle selected by the operation of the user.

* * * * *